3,222,305
FLAME-RESISTANT URETHANE FOAMS AND PROCESS FOR PREPARING SAME
William M. Lanham, Charleston, W. Va., assignor to Union Carbide Corporation, a corporation of New York
No Drawing. Filed Nov. 23, 1962, Ser. No. 239,764
The portion of the term of the patent subsequent to Jan. 29, 1980, has been disclaimed
7 Claims. (Cl. 260—2.5)

This application is a continuation-in-part of application Serial No. 34,872, filed June 9, 1960, in the name of William Morton Lanham, now Patent No. 3,075,927.

This invention relates to flame-resistant polyurethane foams, and particularly to such compositions which are self-extinguishing and possess a high degree of flame resistance.

Synthetic urethane foams derived from reactions involving isocyanates with active hydrogen-containing polyethers are finding widespread utility in the field of insulation, structural reinforcement, cushioning, electrical encapsulation and in domestic electrical equipment such as refrigerators, freezers and the like. One formidable factor limiting the commercial utilization and growth potential of the foamed urethane products is their risk of flammability in applications where high temperatures and/or exposure to fire may be encountered.

Although various organic and inorganic compounds have been recommended for the flameproofing of fibers, textiles, wood and plastics, including, for example, boron phosphorus and chlorine-containing compounds, the oxides of zinc, bismuth, antimony and arsenic, as well as mixtures thereof, the incorporation of such compounds in low density urethane foams having large surface areas frequently results in a loss of desired physical properties, e.g., tensile strength, compression set, elongation and load bearing properties, which limit the utility of the foam for its intended purpose. For example, the incorporation of a hydroscopic flame-proofing additive in a urethane foam may reduce flammability tendencies but at the same time effect an increase in moisture absorption, thus resulting in poor aging characteristics. Similarly the use of flameproofing additives may upset the surface chemistry of the foaming system and lead to severe destruction of internal cell structures, formation of a coarse cell structure and/or collapse of the foam. The difficulty in successful flameproofing urethane foams as opposed to bulk materials is further complicated by the troublesome problems of proper additive distribution at gas-solid interfacial surfaces due to the inherent physical movement of the composition during the foaming operation. As can be appreciated, the efficient flameproofing of a urethane foam is not merely a simple function of incorporating various flameproofing agents.

The discovery has now been made that flame-resistant polyurethane foams possessing desirable physical properties can be readily prepared from polyether derivatives of benzene compounds which have incorporated therein a limited proportion of flameproofing additives consisting of a vinyl halide resin and antimony trioxide. It has been found that the amount of flameproofing additives and the polyether structure are highly significant factors in preparing flame-resistant polyurethane foams without incurring deleterious effects or an appreciable loss of desired physical properties. Urethane foams prepared from polyether derivatives of benzene compounds can be rendered flame-resistant at lower additive levels than comparable urethane formulations derived, for example, from aliphatic-based polyethers. The achievement of flame resistance at a low additive level thus means that in a broad spectrum of polyether-based urethane foams classified as either self-extinguishing or non-burning by the ASTM D-1692-59T flammability test, the flame-resistant urethane compositions of the invention possess better mechanical and physical properties of dimensional stability, cell structure and product strength. By means of the present invention flame-resistant polyurethane foams of widely varying and preselected properties are readily prepared which broadens considerably their realm of practical utility.

The term "flame-resistant" as employed herein is used to characterize a material which does not burn readily. The terms "burning," "self-extinguishing" and "non-burning" are defined in accordance with the "Tentative Method of Test for Flammability of Plastic Foams and Sheeting," ASTM D-1692-59T. In this test the flame of a Bunsen burner, having a blue cone of about 1½ inches in height, is applied separately to the front edge of ten foam specimens, 6" x 2" x ½", and allowed to remain in contact therewith for a period of sixty seconds. The extent of burning is considered the furthermost point reached by the flame front whereas the burning rate in inches per minute is a measure of the time necessary for the flame front to consume five inches of the foam specimen. A sample is judged "non-burning" if no evidence of ignition, such as flame or progressive glow, is seen in each specimen after removal of the flame. If the flame front of two or more specimens reaches the five inch mark the sample is judged "burning." A sample is judged "self-extinguishing" when ignition of the ten specimens gives an extent of burning less than five inches.

In accordance with the invention, polyurethane foams which are self-extinguishing and possess a high degree of flame resistance are produced by reacting an organic polyisocyanate and a polyether derivative of an aromatic compound containing aromatic amino groups, in the presence of from about 0.5 to about 5.0 weight percent antimony trioxide and from about 1.0 to about 10.0 weight percent of vinyl halide resin. The vinyl halide resin and antimony oxide flameproofing ingredients can be added to the liquid polyether, the isocyanate or the polyether-isocyanate reaction mixture. The mixture is then foamed in the presence of a catalyst by means of a blowing agent or internal development of carbon dioxide. The network formation and building up of the foam can take place substantially simultaneously, as in the one-shot method, or in more or less distinct steps as in the prepolymer and semi-prepolymer techniques, more fully described hereinafter.

The amount of antimony trioxide and vinyl halide resin used for purposes of the invention is not narrowly critical. However, to obtain urethane foams of optimum flame resistance which suffer no major effects on desired properties, the preferred amount of vinyl halide resin and antimony trioxide ranges respectively from 4.0 to 8.0% and 3.0 to 6.0% by weight based on the weight of the polyether-isocyanate reaction mixture.

The vinyl halide resins used for purposes of the invention are characterized as having a reduced viscosity of 0.1 and lower to about 10.0 and higher in the best solvent available for a particular resin. The preferred range in this invention is 0.1 to 4.0. Reduced viscosity may be determined with the Ubbelhode, Ostwald or equivalent viscometer in the temperature range between 20° C. and 30° C. using a resin concentration in solution sufficiently low to produce an approximate linear relationship between reduced viscosity and polymer concentration between infinite dilution and the concentration at which the reduced viscosity is determined. Reduced viscosity is defined as:

$$I_r = \frac{T-T_0}{(T_0)(C)}$$

in which T is the time required for a low concentrate resin solution to pass through a standardized Ubbelhode viscometer; $T_0$ is the time for the pure solvent to pass through the viscometer; and C is the concentration of the solution.

Representative vinyl halide resins include homopolymers such as poly(vinyl chloride) and poly(vinylidene chloride) as well as copolymers of vinyl chloride with a vinyl ester of a lower alkanoic acid or other polymerizable olefinically unsaturated compound such as, for example, vinyl acetate, vinyl propionate, vinyl hexoate, methyl acrylate, butyl acrylate, methyl methacrylate, butyl methacrylate, methyl chloroacrylate, acrylonitrile, vinylidene chloride, dibutyl maleate, and the like. Also included are copolymers of a vinyl halide and vinyl ester of a lower alkanoic acid, e.g., vinyl chloride and vinyl acetate, which have been partially hydrolyzed and contain reactive hydroxyl groups. The hydroxyl-containing resins advantageously provide a means whereby the halide can be chemically combined in the urethane molecule by reaction with isocyanate groups (—NCO) to become an integral part of the final form. Carboxylic acid-containing resins, such as a copolymer of vinyl chloride and monobutyl maleate, are also useful in this invention since the carboxylic acid group can be chemically combined in the urethane molecule.

The preferred vinyl halide resins are poly(vinyl chloride) and copolymers of vinyl chloride with vinyl acetate which contain from about 25 to 99% by weight vinyl chloride.

The vinyl halide resins above described also can be used in the form of a plastisol, the term "plastisol" referring to fluid suspensions of finely divided vinyl halide resins in liquid plasticizers. The plastisol technique offers a distinct advantage in urethane applications by providing a fluid dispersion at room temperature which can be easily pumped or used in spray techniques.

Representative liquid plasticizers which can be employed include non-polymerizable ester plasticizers such as the alkyl and aryl phosphates, the alkyl phthalates, adipates, sebacates, azelates and epoxidized vegetable oil. Among these can be mentioned tri-(2-ethylhexyl)phosphate, tricresyl phosphate, di-(2-ethylhexyl)phthalate, and di-(2-ethylhexyl)adipate, etc. Other suitable plasticizers include triethylene glycol di-(2-ethylhexoate), polyethylene glycol di-(2-ethylhexoate), 2,2'-(2-ethylhexamido)-diethyl-di-(2-ethylhexoate), tetrabutyl thiodisuccinate and the commercial plasticizers sold under the trademark "Santicizer" which include Santicizer 8=A mixture of ortho and para toluene ethyl sulfonamides
Santicizer 9=A mixture of ortho and para toluene sulfonamides
Santicizer 130=N-isopropyl benzene sulfonamide
Santicizer 131=Mixed N-isopropyl benzene sulfonamide and N-isopropyl toluene sulfonamide
Santicizer 3=N-ethyl-p-toluene sulfonamide
Santicizer IH=Cyclohexyl-p-toluene sulfonamide The preferred plasticizers are the non-combustible plasticizers such as tricresyl phosphate, tri-(2-ethylhexyl) phosphate, tri-(2-chloroethyl)phosphate, and tri-(dichloropropyl)phosphate. These plasticizers as well as others mentioned above can be employed in resin to plasticizer weight ratios in the range of about 5:1 to 1:2 and preferably 4:1 to 1:1.

The polyethers used in preparing the flame-resistant polyurethane foams include a wide variety of polyether derivatives of benzene compounds. The designated polyethers contain at least one aromatic amine nucleus and are further characterized as having a molecular weight of at least about 200, a plurality of ether oxygens and at least two active hydrogens as measured and determined by the Zerewitinoff method, J.A.C.S., vol. 49, p. 3181 (1927).

Suitable polyethers include the 1,2-alkylene oxide derivatives of mononuclear primary amines such as aniline, o-, m-, and p-phenylenediamine; toluidine, 2,4- and 2,6-diaminotoluene; xylidine, 2,6-diamino-p-xylene; 4,6-diamino-m-xylene; 2,4-diamino-m-xylene; 3,5-diamino-o-xylene; isohexyl-p-phenylenediamine; 3,5-diaminotoluene; and the like; polynuclear and fused aromatic polyamines such as 1,4-naphthylenediamine; 1,5-naphthylenediamine; 1,8-naphthylenediamine; benzidine; tolidine; 4,4'-methylenedianiline; 3,3'-dimethoxy-4,4'-biphenyldiamine; 3,3'-dichloro-4,4'-biphenyldiamine; 3,3'-dimethyl-4,4'-biphenyldiamine; 4,4'-ethylene-dianiline; 4,4'-ethylidenedianiline; 1-fluoreneamine; 2,5-fluorenediamine; 2,7-fluorenediamine; 1,4-anthradiamine; 3,3'-biphenyldiamine; 3,4-biphenyldiamine; 9,10-diaminophenanthrene; and 4,4'-diaminoazobenzene, etc.

Higher functional mono- and polynuclear polyamines which also can be reacted with 1,2-alkylene oxides to provide useful polyether starting materials include 2,4,6-triaminotoluene; 2,3,5-triaminotoluene; 5,6-diaminoacenaphthene, 4,4',4''-methylidynetrianiline, 3,5-diaminobenzoic acid, triaminodiphenyl ethers and sulfides such as 2,4,4'-triaminodiphenyl ether; 2,3',4-triamino-4'-methyldiphenyl ether; 2,3',4-triamino-4'-methoxydiphenyl ether; and polyamines obtained by interaction of aromatic monoamines with formaldehyde or other aldehydes, for example:

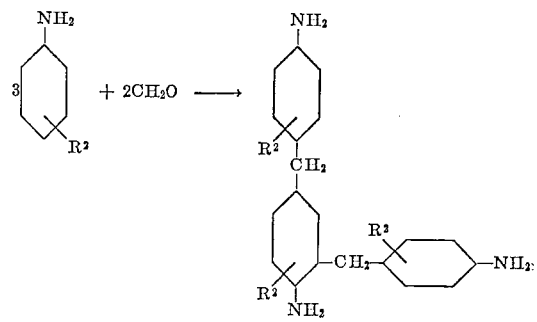

wherein $R^2$ is hydrogen, alkoxy, halo, or the like.

Another very useful class of polyethers which are derived from compositions containing aromatic amino groups are the alkylene oxide adducts of phenol-aromatic amine-aldehyde ternary condensation products. These polyether-polyols are prepared by reacting one or more vicinal epoxides with a phenol-aromatic amine-aldehyde condensation product employed as a starter, under conditions fully described hereinbelow at a more appropriate section of the specification, and recovering the polyol thereby produced.

The phenol-aromatic amine-aldehyde condensation products employed as starters in the production of these polyols are prepared by the reaction of a phenol, an aromatic amine, and an aldehyde. This ternary condensation reaction can apparently proceed by several routes, one of which is the initial reaction of the aldehyde with the aromatic amine to produce an N-(1-hydroxyalkyl) aromatic amine, which in turn condenses with the phenol. This product then rearranges to form an aminoarylhydroxyarylalkane. The following sequence of reactions between formaldehyde, aniline, and phenol, is illustrative:

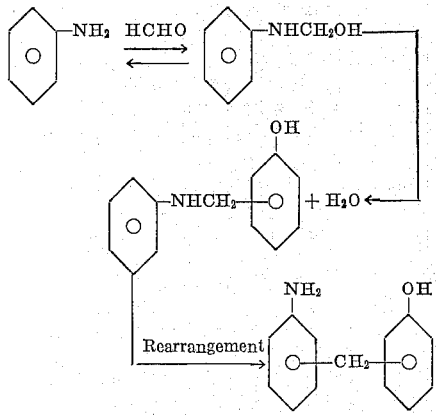

The amino group is thus freed to react with additional formaldehyde, and the sequence of reactions is continued. By proper adjustment of the reaction conditions, the molecular structure of the condensation products can be controlled within readily reproducible limits, which permits a high degree of batch-to-batch uniformity. Whereas in the preferred embodiment of the present invention the above-described condensation reaction is conducted in the absence of a catalyst, it is within the scope of the invention to perform said condensation reaction in the presence of an acidic or a basic catalyst if desired.

The phenols which can be employed to produce the condensation products are the phenols which have at least one unsubstituted reactive position on the aromatic nucleus. It is normally the case that the reactive positions on the aromatic nucleus are those which are ortho or para, and preferably ortho, to the hydroxyl group. Therefore, phenols which have at least one unsubstituted position ortho or para to the hydroxyl group can be used, but if only one reactive position is present it is preferred that said reactive position be ortho to the phenolic hydroxyl group. The phenols which can be employed include, among others, phenol, the alkylphenols, the halophenols, the alkoxyphenols, the aminophenols, the dialkylaminophenols, the dihydroxybenzenes, the naphthols, and the like, which have at least one unsubstituted reactive position on the aromatic nucleus. Specific examples of phenols which can be employed include, among others, phenol, o-, m-, and p-cresol, o-, m-, and p-ethylphenol, o-, m-, and p-propylphenol, para-t-butylphenol and other butylphenols, the pentylphenols, the hexylphenols, the heptylphenols, the octylphenols, the nonylphenols, the decylphenols, the dodecylphenols, the pentadecylphenols, the octadecylphenols, the dimethylphenols, the diethylphenols, the dipropylphenols, the dibutylphenols, cresylic acids and other mixtures of alkylphenols, para-aminophenol, chlorophenols, certain dichlorophenols, the bromophenols, o-, m-, and p-methoxyphenol, o-, m-, and p-ethoxyphenol, o-, m-, and p-butoxyphenol, o-, m-, and p-N,N-dimethylaminophenol, resorcinol, catechol, phloroglucinol and other trihydroxybenzenes, naphthols, dihydroxynaphthalenes, bisphenol A, bisphenol sulfone, and other bisphenols, aminophenols, trihydroxybiphenyl and other hydroxybiphenyls, and the like. The preferred phenols are those which can be represented by the formula

wherein each $R^1$ individually represents hydrogen, alkyl, preferably having not more than 18 carbon atoms and more preferably not more than 10 carbon atoms, hydroxyl, amino, chloro, alkylamino or dialkylamino wherein preferably the alkyl groups thereof have not more than 18 carbon atoms and more preferably not more than 10 carbon atoms, provided that at least one $R^1$ is a hydrogen that is bonded to a reactive position on the aromatic nucleus. The most preferred phenols are phenol, the alkylphenols, meta and para aminophenols, and the monochlorophenols.

The aromatic amines which can be employed are those which are represented by the formula ArNHR wherein Ar is an aryl group which has at least one unsubstituted reactive position on the aromatic nucleus, and wherein R represents a hydrogen or an alkyl. Ordinarily, the reactive positions are those which are ortho and para to the amino group. Accordingly, aromatic amines which have at least one unsubstituted position ortho or para to the amino group are highly desirable for use in preparing the condensation products employed in the invention. Among the aromatic amines which can be employed are aniline, the aminophenols, benzenediamines, alkyl-substituted anilines, alkyl-substituted benzenediamines, N-alkyl-substituted anilines, the naphthylamines, N-alkylaminoanilines, the haloanilines, and the like. Specific examples of aromatic amines which can be employed include, among others, aniline; m-, and p-benzenediamine; o-, m-, and p-toluidine; o-, m-, and p-ethylaniline; o-, m-, and p-butylaniline; 2,3-xylidine and other xylidines; 2,4- and 2,6-diaminotoluene and certain other diaminotoluenes; 1-ethyl-2,4-diaminobenzene; 1-propyl-2,4-diaminobenzene; 1-butyl-2,4-diaminobenzene; o-, and p-diethylaminoaniline; o-, and p-dimethylaminoaniline; alhpa-naphthylamine and other mono- and polyaminonaphthalenes; para-aminophenol and other aminophenols; o - chloroaniline and other chloroanilines and bromoanilines; aromatic amine/formaldehyde condensation products such as diaminodiphenylmethanes, triaminotriphenylmethanes, and the like; bis(aminophenyl)sulfones such as bis(4-aminophenyl)sulfone, and the like; N-alkylanilines such as N-methylaniline, N-ethylaniline and higher N-alkylanilines, N-methyltoluidines, and all of the aromatic amines enumerated above having N-alkyl substituents, but containing at least 1 amino hydrogen, and the like. The preferred aromatic amines are those which can be represented by the formula

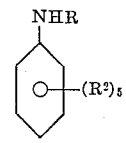

wherein R represents hydrogen or alkyl, preferably of not more than 4 carbon atoms, and wherein each $R^2$ individually represents a hydrogen, amino, alkylamino or dialkylamino wherein the alkyl groups thereof preferably have not more than 18 carbon atoms and more preferably not more than 10 carbon atoms, or hydroxyl, provided that at least one $R^2$ represents a hydrogen that is bonded to a reactive position on the aromatic nucleus. The most preferred amines are aniline, the alkyl-substituted anilines, and the alkyl-substituted m-diaminobenzenes.

The aldehydes which can be employed include, among others, formaldehyde, acetaldehyde, propionaldehyde chloral, and the like. Formaldehyde is preferred. The aldehyde can be employed in water solution or in an organic solvent. It is preferred to employ the formaldehyde in solution in methanol or as the 37 weight percent aqueous solution known as formalin.

The proportion of the reactants employed to prepare the phenol-aromatic amine-aldehyde condensation products can be varied over a wide range. For example, for phenol and aniline themselves, the phenol-aromatic amine molar ratio can be varied from about 15:1, and higher, to about 1:15, and lower. A desirable molar ratio of phenol-aromatic amine is between about 9:1 and 1:9. The preferred molar ratio of phenol-aromatic amine is in the range of from about 6:1 to about 1:6, and most preferably from about 3:1 to about 1:3. When substituted and polyfunctional phenols and aromatic amines are employed, the ratios may vary somewhat from those indicated above. The molar ratio of (phenol+aromatic amine):aldehyde can be varied from about 20:1, and higher, to about 1:1, and lower. The preferred molar ratio of (phenol+aromatic amine):aldehyde is from about 6:1 to about 1.2:1, and most preferably from about 4:1 to about 1.4:1. Again, when substituted and polyfunctional phenols and aromatic amines are employed, the ratio may vary somewhat from those indicated.

The preferred phenol-aromatic amine-aldehyde condensation products are those which are permanently fusible. The preparation of the permanently fusible condensation products is dependent chiefly upon the amount of aldehyde employed. As a guide, it has been found that when the molar ratio of (phenol+aromatic amine):aldehyde is smaller than about 1.2:1, it becomes increasingly difficult to avoid residual reactivity which promotes crosslinking of the condensation products. Although the condensation products which are crosslinked, i.e., not permanently fusible, can be employed in the invention, the processing advantages attendant with the use of a permanently fusible condensation product are apparent, and for that reason, the permanently fusible condensation products are preferred.

The preferred method for carrying out the condensation reaction is to add the aldehyde slowly to an agitated mixture of phenol and aromatic amine, said mixture being maintained at a temperature of from about 0° C., and lower, to about 200° C., and higher, and preferably from about 60° C. to about 180° C., during the addition. After the addition of aldehyde, which can take from about 30 minutes to about 20 hours longer, the reaction mixture is maintained at or above the temperature at which the aldehyde was charged for up to about 2 hours. At the end of the reaction period, the condensation product can then be recovered by stripping off water, unreacted reagents, and any solvents that may be present, by heating to about 160° C.–200° C. and thereafter reducing the pressure.

Conventional equipment can be employed for the condensation reaction. For example, a reaction kettle equipped with agitator, means for reflux and distillation, nitrogen inlet means, and conventional heat transfer means, is suitable. The material of construction can be steel, stainless steel, glass, Monel, and the like.

The condensation products described above are employed as "starters" to produce polyols by reacting said condensation products with one or more vicinal epoxides. The vicinal epoxides which can be employed include, for example, the alkylene oxides, the aryl glycidyl ethers, the aryl-substituted alkylene oxides, the cycloalkylene oxides, the halogen-substituted alkylene oxides, and the like, which preferably have from 2 to 10 carbon atoms and which have one vicinal epoxide group per molecule. Specific examples of vicinal epoxides which can be employed include, among others, ethylene oxide; 1,2-epoxypropane; 1,2-epoxybutane; 2,3-epoxybutanes; 2-methyl-1,2-epoxypropane, the epoxypentanes; the epoxyhexanes; the epoxyheptanes; the epoxyoctanes; the epoxydecanes; phenyl glycidyl ether; tolyl glycidyl ether; ethylphenyl glycidyl ether; propylphenyl glycidyl ether; butylphenyl glycidyl ether; styrene oxide; 1,2-epoxycyclohexane; 1,2-epoxycyclopentane; 2,3-epoxybicyclo[2,2,1] heptane; 4-chloro-1,2-epoxybutane; and the like. The preferred vicinal epoxides are the lower alkylene oxides such as ethylene oxide, 1,2-epoxypropane, and the epoxybutanes.

The polyols under consideration are prepared by reacting a vicinal epoxide with a phenol-aromatic amine-aldehyde condensation product. The epoxide reacts with the phenolic hydroxyl groups and with the primary or secondary amino groups which are present in the condensation product, to form substituted or unsubstituted oxyalkylene chains of varying lengths, wherein each chain is connected to the condensation product through a phenolic oxygen atom or through an aromatic amino nitrogen atom at one end, and wherein each chain is terminated by a hydroxyl group at the other end. The addition reaction can be carried out in an inert organic vehicle, but is preferably carried out by slowly adding the epoxide to an agitated batch of fused phenol-aromatic amine-aldehyde condensation product. The reaction temperature can vary over a wide range, for example, from about 80° C. to about 220° C., and preferably from about 130° C. to about 190° C. The reaction time is dependent, in part, upon several factors, such as temperature, nature and proportion of reagents, and the like. Therefore, the reaction time can vary over a wide range, for example, from about 30 minutes to about 20 hours, and longer, and preferably from about 1 hour to about 10 hours. A limited amount of vicinal epoxide will add to some of the phenolic hydroxyl groups of the condensation products without employing a catalyst. Although it varies with the nature of the particular reagents employed, up to about 1.0 mole of vicinal epoxide per equivalent of phenolic hydroxyl groups contained in the condensation product will add without the use of a catalyst. Additional vicinal epoxide can then be added by employing a catalyst, for example, alkali metal and alkaline earth metal hydroxides or alkoxides such as sodium hydroxide, potassium hydroxide, calcium hydroxide, barium hydroxide, sodium methoxide; tertiary aliphatic amines such as trimethylamine; and proton acids and Lewis acids. The catalyst is employed in an amount of from about 0.02 weight percent to about 1.0 weight percent or more, and preferably from about 0.05 to about 0.2 weight percent, based on total weight of reactants.

The proportion of the vicinal epoxide and the phenol-aromatic amine-aldehyde condensation product can vary widely. The amount of vicinal epoxide employed depends upon the length of the oxyalkylene chains that it is desired to build up. The chain length can be tailor-made, depending upon the particular type of urethane foam which is to be prepared from the polyol. The polyols can have oxyalkylene chains which average from about 1.0, and lower to about 30, and higher, oxyalkylene units per reactive hydrogen atoms contained in the phenol-aromatic amine-aldehyde condensation product. (The reactive hydrogens are the phenolic hydroxyl hydrogens and the aromatic amino hydrogens.) Such products are within a hydroxyl number range of from about 30 to about 700, and have molecular weights of at least about 350.

Within these limits it can be stated that the preferred polyols for the preparation of rigid foams have oxyalkylene chains which average from about 1.5 to about 2.5 oxyalkylene units per reactive hydrogen atom. The preferred polyols for the production of semi-flexible foams have oxyalkylene chains which average from about 2.5 to about 10 or more oxyalkylene units, and the preferred polyols for the production of flexible foams have oxyalkylene chains which average from about 15 to about 30 oxyalkylene units.

After the reaction of vicinal epoxide with phenol-aromatic amine-aldehyde condensation product, the polyol products can be recovered by conventional methods. For example, a suitable method of recovery is to dilute the polyol with an inert organic vehicle, for example methanol or 2-propanol, and to pass the diluted polyol through an ion exchange resin to remove any catalyst that was employed for the epoxide addition reaction. The inert organic vehicle can then be stripped off, along with any unreacted epoxide that might be present, thereby recovering the polyol product.

Conventional reaction equipment can be employed for the epoxide addition reaction. If desired, the same equipment employed for the preparation of the phenol-aromatic amine-aldehyde condensation product can be utilized for the epoxide addition reaction. The pressure under which the reaction is conducted is not critical, and it can be atmospheric, subatmospheric, or superatmospheric.

The procedure described above for producing alkylene oxide adducts of phenol-aromatic amine-aldehyde ternary condensation products is generally applicable to the production of alkylene oxide adducts of other aromatic amine-containing compositions.

The average molecular weight and reactivity of the alkylene oxide addition products can be determined readily by analysis for hydroxyl content. The hydroxyl number is a measure of and is proportional to the hydroxyl concentration per unit weight. The hydroxyl number is defined in terms of milligrams of KOH equivalent per gram of alkylene oxide reaction product and is determined by reacting acetic anhydride (in pyridine solution) at refluxing temperature with the hydroxyl groups of the reaction product. The unreacted anhydride and acetic acid formed are titrated with aqueous sodium hydroxide using phenolphthalein as an indicator. The molecular weight can be readily calculated from the hydroxyl number by the formula:

$$M.W. = \frac{\text{Functionality} \times 1000 \times 56.1}{\text{Hydroxyl No.}}$$

The molecular weight of the polyethers used in preparing the flame-resistant polyurethane foams should range from about 200 to about 7500 to obtain foams of rigid, semi-rigid, or flexible characteristics. Based on hydroxyl number the preferred polyethers are those which have hydroxyl numbers ranging from about 30 to about 700 as defined herein.

Thus, the polyethers employed in the invention are polyoxyalkylene polyols which have molecular weights of from about 200 to about 7500, contain at least 2 alcoholic hydroxyl groups, and are characterized by the presence of at least 1 aromatic amine nucleus. Usually, the alcoholic hydroxyl groups of the polyols used are the only groups in the polyol that are reactive with isocyanate.

A variety of organic polyisocyanates may be employed for reaction with the polyethers above described to provide urethane foams which can be prepared according to the invention. Preferred isocyanates are polyisocyanates and polyisothiocyanates of the general formula:

$$(RNCG)_x$$

wherein G is oxygen or sulfur, $x$ is an integer of two or more and R is an alkylene, substituted alkylene, arylene or substituted arylene radical, a hydrocarbon, or substituted hydrocarbon containing one or more aryl —NCG bonds and one or more alkyl —NCG bond. R can also include radicals such as —RZR— where Z may be a divalent moiety such as —O—, —O—R—O—, —CO—, —CO$_2$—, —S—, —S—R—S—, —SO$_2$—, etc. Examples of such compounds include hexamethylene diisocyanate, 1,8-diisocyanato-p-methane, xylylene diisocyanates, $$(OCNCH_2CH_2CH_2OCH_2)_2$$

1-methyl-2,4 - diisocyanatocyclohexane, phenylene diisocyanates, tolylene diisocyanates, chlorophenylene diisocyanates, diphenylmethane-4,4′-diisocyanate, naphthalene-1,5-diisocyanate, triphenylmethane-4,4′,4″ - triisocyanate, xylene-α,α′-diisothiocyanate, and isopropylbenzene-α-4-diisocyanate.

Further included are dimers and trimers of isocyanates and diisocyanates and polymeric diisocyanates of the general formulae:

$$(RNCG)_x \text{ and } [(NCG)_x]_y$$

in which $x$ and $y$ are two or more, as well as compounds of the general formula:

$$M(NCG)_x$$

in which $x$ is two or more and M is a monofunctional or polyfunctional atom or group. Examples of this type include ethylphosphonic diisocyanate, $C_2H_5P(O)(NCO)_2$; phenylphosphonic diisocyanate, $C_6H_5P(NCO)_2$; compounds containing a =Si—NCG group, isocyanates derived from sulfonamides, $R(SO_2NCO)_x$, and the like.

Also useful are polyisocyanates prepared by phosgenation of aniline/formaldehyde condensation products.

The preparation of polyether-based urethane foams can be carried out by the one-shot or semiprepolymer techniques, each of which are well known. In the semiprepolymer technique, the polyether reactant is partially extended with excess isocyanate to provide a reaction product containing a high percentage of free isocyanate groups (20 to 35%) which is foamed at a later stage by reaction with additional polyether, catalyst and a blowing agent. In the one-shot technique, all of the reactants are reacted simultaneously with the foaming operation.

The amount of isocyanate employed will depend upon the density of the urethane foam and the amount of cross linking desired. In general the total —NCO equivalent to total active hydrogen equivalent (i.e., hydroxyl plus water, if water is present) should be such as to provide a ratio of 0.8 to 1.2 equivalents of —NCO per equivalent of active hydrogen, and preferably a ratio of about 1.0 to 1.1 equivalents of —NCO per reactive hydrogen.

Foaming can be accomplished by employing a small amount of water in the reaction mixture (for example, from about 0.5 to 5 weight percent of water, based on total weight of the reaction mixture), or through the use of blowing agents which are vaporized by the exotherm of the isocyanate-reactive hydrogen reaction, or by a combination of the two methods. All of these methods are known in the art. The preferred blowing agents are certain halogen-substituted aliphatic hydrocarbons which have boiling points between about −40° C. and 70° C., and which vaporize at or below the temperature of the foaming mass. The blowing agents include, for example, trichloromonofluoromethane, dichlorodifluoromethane, dichloromonofluoromethane, dichloromethane, trichloromethane, bromotrifluoromethane, chlorodifluoromethane, chloromethane, 1,1-dichloro-1-fluoroethane, 1,1-difluoro-1,2,2-trichloroethane, chloropentafluoroethane, 1-chloro-1-fluoroethane, 1-chloro-2-fluoroethane, 1,1,2-trichloro-1,2,2-trifluoroethane, 1,1,1-trichloro-2,2,2 - trifluoroethane, 2-chloro-1,1,1,2,3,3,4,4,4 - nonafluorobutane, hexafluorocyclobutene, and octafluorocyclobutane. Other useful blowing agents include low-boiling hydrocarbons such as butane, isopentane, hexane, cyclohexane, and the like. Many other compounds easily volatilized by the exotherm of the isocyanate-reactive hydrogen reaction also can be employed. A further class of blowing agents includes thermally-unstable compounds which liberate gases upon heating, such as N,N′-dimethyl-N,N′-dinitrosoterephthalamide.

The amount of blowing agent used will vary with the density desired in the foamed product. In general it may be stated that for 100 grams of reaction mixture containing an average isocyanate/reactive hydrogen ratio of about 1:1, about 0.005 to 0.3 mole of gas are used to provide densities ranging from 30 to 1 pound per cubic foot respectively.

Catalysts can be employed in the reaction mixture for accelerating the isocyanate-reactive hydrogen reaction. Such catalysts include a wide variety of compounds such as, for example:

(a) Tertiary amines such as trimethylamine, triethylamine, N-methylmorpholine, N-ethylmorpholine, N,N-dimethylbenzylamine, N,N-dimethylethanolamine, N,N,-N',N'-tetramethyl-1,3-butanediamine, triethanolamine, 1,4-diazabicyclo[2,2,2]octane, 1,2,4 - trimethylpiperazine, bis-(dimethylaminomethyl)amine, and the like;

(b) Tertiary phosphines such as trialkylphosphines, dialkylbenzylphosphines, and the like;

(c) Strong bases such as alkali and alkaline earth metal hydroxides, alkoxides, and phenoxides;

(d) Acidic metal salts of strong acids such as ferric chloride, stannic chloride, stannous chloride, antimony trichloride, bismuth nitrate and chloride, and the like;

(e) Chelates of various metals such as those which can be obtained from acetylacetone, benzoylacetone, trifluoroacetylacetone, etthyl acetoacetate, salicyladehyde, cyclopentanone-2-carboxylate, acetalacetoneimine, bis-acetylacetylacetone, ethyl acetoacetate, salicylaldehyde, cyclolike, with various metals such as Be, Mg, Zn, Cd, Pb, Ti, Zr, Sn, As, Bi, Cr, Mo, Mn, Fe, Co, Ni, or such ions as $MoO_2^{++}$, $UO_2^{++}$, and the like;

(f) Alcoholates and phenolates of various metals such as $Ti(OR)_4$, $Sn(OR)_4$, $Sn(OR)_2$, $Al(OR)_3$, and the like, wherein R is alkyl or aryl, and the reaction products of alcoholates with carboxylic acids, beta-diketones, and 2-(N,N-dialkylamino)alkanols, such as the well known chelates of titanium obtained by said or equivalent procedures;

(g) Salts of organic acids with a variety of metals such as alkali metals, alkaline earth metals, Al, Sn, Pb, Sb, Mn, Co, Ni, and Cu, including, for example, sodium acetate, potassium laurate, calcium hexanoate, stannous acetate, stannous octoate, stannous oleate, lead octoate, metallic driers such as manganese and cobalt naphthenate, and the like;

(h) Organometallic derivatives of tetravalent tin, trivalent and pentavalent As, Sb, and Bi, and metal carbonyls of iron and cobalt. Among the organotin compounds that deserve particular mention are dialkyltin salts of carboxylic acids, e.g., dibutyltin diacetate, dibutyltin dilaurate, dibutyltin maleate, dilauryltin diacetate, dioctyltin diacetate, dibutyltin-bis(4-methylaminobenzoate), dibutyltin-bis(6-methylaminocaproate), and the like. Similarly there may be used a trialkyltin hydroxide, dialkyltin oxide, dialkyltin dialkoxide, or dialkyltin dichloride. Examples of these compounds include trimethyltin hydroxide, tributyltin hydroxide, trioctyltin hydroxide, dibutyltin oxide, dioctyltin oxide, dilauryltin oxide, dibutyltin - bis(isopropoxide), dibutyltin - bis(2-dimethylaminopentylate), dibutyltin dichloride, dioctyltin dichloride, and the like, (i) Tertiary amine oxides such as pyridine-N-oxide, and the like.

The tertiary amines may be used as primary catalysts for accelerating the reactive hydrogen/isocyanate reaction or as secondary catalysts in combination with one or more of the above-noted metal catalysts. Metal catalysts, or combinations of metal catalysts, may also be employed as the accelerating agents, without the use of amines. The tin catalysts are the preferred metal catalysts. The catalysts are employed in small amounts, for example, from about 0.001 percent to about 5 percent, based on weight of the reaction mixture.

It is also within the scope of the invention to employ small amounts, e.g., about 0.001% to 5.0% by weight, based on the total reaction mixture, of an emulsifying agent such as a polysiloxane-polyoxyalkylene block copolymer having from about 10 to 80 percent by weight of siloxane polymer and from 90 to 20 percent by weight of alkylene oxide polymer, such as the block copolymers described in U.S. Patents 2,834,748 and 2,917,480. Another useful class of emulsifiers are the "non-hydrolyzable" polysiloxane-polyoxyalkylene block copolymers. This class of compounds differs from the above-mentioned polysiloxane-polyoxyalkylene block copolymers in that the polysiloxane moiety is bonded to the polyoxyalkylene moiety through direct carbon-to-silicon bonds, rather than through carbon-to-oxygen-to-silicon bonds. These copolymers generally contain from 5 to 95 weight percent, and preferably from 5 to 50 weight percent, of polysiloxane polymer with the remainder being polyoxylkylene polymer. The copolymers can be prepared, for example by heating a mixture of (a) a polysiloxane polymer containing a silicon-bonded, halogen-substituted monovalent hydrocarbon group, and (b) an alkali metal salt of a polyoxyalkylene polymer, to a temperature sufficient to cause the polysiloxane polymer and the salt to react to form the block copolymer. Other useful emulsifiers include such materials as polyethoxylated vegetable oils, commercially available as "Selectrofoam 6903," "Emulphor EL–720," and others. Although the use of an emulsifier is desirable to influence the type of foam structure that is formed, the foam products of the invention can be prepared without emulsifiers in some cases.

The following examples illustrate various aspects of the invention:

EXAMPLE 1

130 grams of a polyether blend prepared by the addition of propylene oxide to 1,1,3-tris(hydroxyphenyl)propane (hydroxyl No. 268) and 96 grams of a semiprepolymer prepared therefrom by reaction with tolylene diisocyanate (29.1% total free NCO) were mixed with 1.0 gram dibutyltin dilaurate, 1.0 gram of a silicone oil surfactant (siloxane-oxyalkylene block copolymer) and 39–41 grams of trichloromonofluoromethane. As soon as the mixture began to foam it was discharged into an open mold and cured for 10 minutes at 70° C. The foamed product has a density between 1.9 and 2.1 lbs./cu. ft.

EXAMPLE 2

80 grams of the polyether blend as prepared in Example 1 (hydroxyl No. 268) and 80 grams of a polyether blend prepared by the addition of propylene oxide to 4,4'-diaminodiphenylmethane (hydroxyl No. 230) were mixed with 66 grams of tolylene diisocyanate, 1.2 grams of a silicone oil surfactant (siloxane-oxyalkylene copolymer), 0.4 gram dibutyltin dilaurate, 0.4 gram N,N,N',N'-tetramethyl-1,3-butanediamine and 35–38 grams of trichloromonofluoromethane. The foamed product was cured at 70° C. for 10 minutes and has a density between 2.0 and 2.8 lbs./cu. ft.

The polyurethane foams prepared in Examples 1 and 2 were blended prior to foaming with varying amounts of antimony trioxide and vinyl halide resin and tested for flammability characteristics according to the ASTM D–1692–59T test procedure previously described. If the foam burns (ASTM Class B) the rate of burning is reported in inches per minutes (i.p.m.). If the foam is self-extinguishing (ASTM Class S) or non-burning (ASTM Class N) the extent of burning is reported in inches. In instances where ignition of ten specimens results in nine specimens classified as non-burning (N) and one specimen self-extinguishing (S), the flammability of the sample has been judged inconclusive (I). The data tabulated in Table I below illustrate that polyurethane foams prepared from polyether derivatives of aromatic amine compounds can be readily rendered flame-resistant (ASTM Class S). The percentages shown are weight percentages based on the polyether-isocyanate reaction mixture.

*Table I*

| Ex. | Percent Polyols Used In— Ex. 1 | Percent Polyols Used In— Ex. 2 | Percent TDI[1] | Percent Vinyl Halide[2] | Percent Sb₂O₃ | Density, p.c.f. | Appearance[4] | ASTM Class | Rate or Extent, in. | Ig/B[3] |
|---|---|---|---|---|---|---|---|---|---|---|
| 3 | 55.4 | | 24.3 | 4 | 1 | 1.9 | AAA | S | 2.3 | 23/83 |
| 4 | 54.9 | | 24.1 | 4 | 2 | 2.1 | AAA | S | 2.3 | 23/96 |
| 5 | 54.3 | | 23.8 | 4 | 3 | 2.1 | ABB | I | 2.6 | 37/154 |
| 6 | 54.9 | | 24.1 | 5 | 1 | 2.1 | ABB | N | 0.7 | |
| 7 | 54.3 | | 23.8 | 5 | 2 | 2.1 | ABB | N | 0.7 | |
| 8 | 53.8 | | 23.6 | 5 | 3 | 2.1 | ABB | N | 0.7 | |
| 9 | 54.3 | | 23.8 | 6 | 1 | 2.1 | ABB | I | 4.1 | 8/144 |
| 10 | 53.8 | | 23.6 | 6 | 2 | 2.0 | ABB | N | 0.8 | |
| 11 | 53.2 | | 23.3 | 6 | 3 | 2.1 | ABB | S | 3.1 | 24/130 |
| 12 | 58.8 | | 25.8 | 0 | 0 | 2.0 | AAA | S | 2.4 | 19/58 |
| 13 | 28.4 | 28.4 | 23.4 | 4 | 2 | 2.0 | ABA | S | 3.3 | 14/114 |
| 14 | 27.7 | 27.7 | 22.8 | 4 | 4 | 2.4 | ABB | S | 2.2 | 15/76 |
| 15 | 27.4 | 27.4 | 22.6 | 5 | 4 | 2.6 | ABB | S | 4.4 | 21/179 |
| 16 | 27.7 | 27.7 | 22.8 | 6 | 2 | 2.5 | ABB | S | 3.5 | 18/154 |
| 17 | 27.1 | 27.1 | 22.3 | 6 | 4 | 2.5 | AAA | I | 3.0 | 19/50 |
| 18 | 30.4 | 30.4 | 25.1 | 0 | 0 | 2.3 | AAA | S | 3.5 | 16/78 |

[1] Mixture of 80% 2,4- and 20% 2,6-tolylene diisocyanate.
[2] Poly(vinyl chloride) having reduced viscosity of 1.42.
[3] Ignition time in seconds/extinguishment time in seconds.
[4] The appearance of the foam is rated by a three-letter code with the first letter estimating average cell size, the second letter uniformity of cell size and the third letter bulk flaws (splits, ridges, burns, etc.) wherein—

| 1st Letter | 2nd Letter | 3rd Letter |
|---|---|---|
| A=Fine | Good. | None. |
| B=Medium | Fair. | Minor. |
| C=Large | Poor. | Severe. |

EXAMPLE 19

A polyol was produced by reacting propylene oxide with an 80/20, by weight, mixture of 2,4- and 2,6-diaminotoluene. An average of about 1.4 propylene oxides per amino hydrogen were added and the resulting polyol had a hydroxyl number of 500.

A quasi-prepolymer was produced from the above-described polyol by the following procedure: 1187 grams of tolylene diisocyanate was added to a reaction flask and the temperature was raised to 65° C. 313 grams of the polyol was added over 73 minutes while maintaining the reaction temperature at 65–70° C. by cooling as required. After the addition, the reaction mixture was maintained at 65–70° C. for 15 minutes, cooled, and was found to contain 63.9 percent free tolylene diisocyanate.

A series of foams were then prepared from the following formulation:

| | Grams |
|---|---|
| Above-described polyol | 100 |
| Above-described quasi-prepolymer | 140 |
| Polysiloxane - polyoxyethyleneoxypropylene emulsifier | 1.0 |
| Dibutyltin dilaurate | 1.0 |
| Trichloromonofluoromethane | 42.0 |
| Sb₂O₃ | Varied |
| Polyvinyl chloride (1.42 reduced viscosity) | Varied |

The properties of the foams are displayed in Table II.

EXAMPLE 20

A polyol was prepared by addition of propylene oxide to an aniline-formaldehyde condensation product. The aniline-formaldehyde condensation product contained an average of 2.5 aniline nuclei per molecule. The polyol had a hydroxyl number of 330 and contained an average polyoxypropylene chain length of 2.4 oxypropylene units.

A quasi-prepolymer was prepared by a procedure analogous to that described in Example 19 from 1038 grams of tolylene diisocyanate and 353 grams of the above-described polyol. The quasi-prepolymer had 61.7 percent free tolylene diisocyanate.

A series of foams were then produced from the following formulation:

| | Grams |
|---|---|
| Polyol described above | 120 |
| Quasi-prepolymer | 104.5 |
| Polydimethylsiloxane - polyoxyethyleneoxypropylene emulsifier | 0.6 |
| Dibutyltin dilaurate | 1.2 |
| Trichloromonofluoromethane | 40.0 |
| Sb₂O₃ | Varied |
| Polyvinyl chloride having a reduced viscosity of 1.42 | Varied |

*Table II*

| Sample | PVC Grams | PVC Percent | Sb₂O₃ Grams | Sb₂O₃ Percent | Density, lbs./ft.³ | ASTM Class** | Extent, inches/min. | Ignition Time, sec. |
|---|---|---|---|---|---|---|---|---|
| 1* | 0 | 0 | 0 | 0 | 1.8 | B | 6.3 | 12 |
| 2 | 0 | 0 | 5.7 | 2 | 1.7 | B | 4.2 | 11 |
| 3 | 8.8 | 3 | 5.8 | 2 | 1.9 | B | 2.9 | 11 |
| 4 | 16.0 | 5 | 6.4 | 2 | 2.0 | B | 2.6 | 15 |
| 5 | 22.8 | 7 | 6.5 | 2 | 2.0 | B | 2.3 | 16 |

*40 grams of trichloromonofluoromethane.
**ASTM D1692-59T.

The properties of the foams are displayed in Table III:

Table III

| Sample | PVC | | Sb₂O₃ | | Density, lbs./ft.³ | ASTM Class | Extent, inches/ min. | Ignition Time, sec. |
|---|---|---|---|---|---|---|---|---|
| | Grams | Percent | Grams | Percent | | | | |
| 1 | 0 | 0 | 0 | 0 | 2.0 | B | 3.1 | 12 |
| 2 | 8.7 | 3 | 5.8 | 2 | 2.0 | S | 1.6 | 14 |
| 3 | 14.8 | 5 | 5.9 | 2 | 2.1 | S | 2.2 | 16 |
| 4 | 21.2 | 7 | 6.0 | 2 | 2.2 | S | 2.3 | 17 |

Alkylene oxide adducts of aniline-formaldehyde condensation products will usually have molecular weights in excess of about 400.

EXAMPLE 21

A polyol was produced from an aniline-phenol-formaldehyde ternary condensation product. The ternary condensation product was produced by adding formaldehyde to a mixture of phenol and aniline over a 2-hour period at about 90° C., the molar ratio of the reactants being 1 mole of formaldehyde to 1.05 moles of phenol and 1.05 moles of aniline. After the formaldehyde addition period, the reaction mixture was heated to 180° C. and held there for about 3 to 4 hours, after which the pressure was reduced to remove unreacted starting material. After cooling, a product was recovered which had a functionality of about 5.5 and an equivalent weight of about 68.6. The polyol was produced by adding a 20:80 ethylene oxide:propylene oxide (by weight) mixture to yield a polyol having a hydroxyl number of about 320.

A quasi-prepolymer was produced by a procedure analogous to that described in Example 19, from 1180 grams of tolylene diisocyanate and 400 grams of the above-described polyol. The quasi-prepolymer had a free tolylene diisocyanate content of 61.7 percent.

A series of foams were produced from the following formulation:

| | Grams |
|---|---|
| Polyol described above | 140 |
| Quasi-prepolymer described above | 119 |
| Polydimethylsiloxane - polyoxyethyleneoxypropylene emulsifier | 1.0 |
| Dibutyltin dilaurate | 1.0 |
| Trichloromonofluoromethane | 42.0 |
| Sb₂O₃ | Varied |
| Polyvinyl chloride, reduced viscosity 1.42 | Varied |

The foams had the properties displayed in Table IV:

Table IV

| Sample | PVC | | Sb₂O₃ | | Density, lbs./ft.³ | ASTM Class | Extent, inches/ min. | Ignition Time |
|---|---|---|---|---|---|---|---|---|
| | Grams | Percent | Grams | Percent | | | | |
| 1 | 0 | 0 | 0 | 0 | 2.1 | B | 3.6 | 14 |
| 2 | 9.5 | 3 | 6.4 | 2 | 2.3 | S | 2.3 | 15 |
| 3 | 16.1 | 5 | 6.5 | 2 | 2.2 | S | 3.0 | 18 |
| 4 | 23.0 | 7 | 6.6 | 2 | 2.4 | S | 2.0 | 18 |

The preceding examples have illustrated various aspects of the invention. As can be seen, the polyurethane foams of the invention are highly useful products for use in applications which require a high degree of flame resistance, for instance, in building construction, in refrigerators as insulation, and the like.

What is claimed is:

1. A process for the production of flame resistant polyurethane foams which comprises reacting an organic polyisocyanate with a polyol having a molecular weight in the range of from about 350 to about 7500 and which has at least 2 alcoholic hydroxyl groups, said polyol comprising the alkylene oxide adduct of an aromatic amine-phenol-formaldehyde condensation product; wherein the reaction of said organic polyisocyanate and said polyol takes place in the presence of a catalyst, blowing agent, emulsifier, from about 0.5 to about 5.0 weight percent antimony trioxide, and from about 1.0 to about 10.0 weight percent of vinyl chloride polymer, the percentages being based upon weight of polyol plus organic polyisocyanate; and wherein said aromatic amine-phenol-formaldehyde condensation product is produced from (a) an aromatic amine of the formula

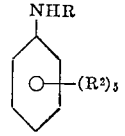

wherein R represents a number of the group consisting of hydrogen and alkyl of up to 4 carbon atoms, and each R² individually represents a member of the group consisting of hydrogen, alkyl, amino, alkylamino, dialkylamino, and hydroxyl, provided that at least one R² represents a hydrogen bonded to a reactive position on the aromatic nucleus, (b) a phenol of the formula

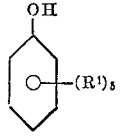

wherein each R¹ individually represents a member of the group consisting of hydrogen, alkyl, hydroxyl, amino, chloro, and dialkylamino, provided that at least one R¹ represents hydrogen bonded to a reactive position on the aromatic nucleus, and (c) formaldehyde, wherein the molar ratio of phenol: aromatic amine is in the range of from about 15:1 to about 1:15, and wherein the molar ratio of (phenol plus aromatic amine):formaldehyde is in the range of from about 6:1 to about 1.2:1.

2. The process of claim 1 wherein said alkylene oxide is a member selected from the group consisting of ethylene oxide, propylene oxide, butylene oxide, and mixtures thereof.

3. The process of claim 1 wherein said catalyst is a member selected from the group consisting of tertiary amines, organic tin compounds, and mixtures thereof.

4. The process of claim 1 wherein said organic polyisocyanate is tolylene diisocyanate.

5. The process of claim 1 wherein said emulsifier is a polysiloxane-polyoxyalkylene block copolymer.

6. The process of claim 1 wherein said blowing agent is a member selected from the group consisting of water, liquified fluorocarbon gases, and mixtures thereof.

7. The product produced by the process of claim 1.

References Cited by the Examiner

UNITED STATES PATENTS

| 3,030,426 | 4/1962 | Moseley et al. | 260—613 |
| 3,073,788 | 1/1963 | Hostettler et al. | 260—2.5 |
| 3,075,927 | 1/1963 | Lanham | 260—2.5 |
| 3,075,928 | 1/1963 | Lanham | 260—2.5 |

FOREIGN PATENTS

| 502,860 | 3/1939 | Great Britain. |

LEON J. BERCOVITZ, *Primary Examiner.*

DONALD E. CZAJA, *Examiner.*